United States Patent
Yang (10) Patent No.: US 10,263,222 B2
(45) Date of Patent: Apr. 16, 2019

(54) TUBULAR LITHIUM BATTERY

(71) Applicants: Prologium Technology Co., Ltd., New Taipei (TW); Prologium Holding Inc., Grand Cayman (KY)

(72) Inventor: Szu-Nan Yang, New Taipei (TW)

(73) Assignees: Prologium Technology Co., Ltd., New Taipei (TW); Prologium Holding Inc., Grand Cayman (KY)

( * ) Notice: Subject to any disclaimer, the term of this patent is extended or adjusted under 35 U.S.C. 154(b) by 154 days.

(21) Appl. No.: 15/281,150

(22) Filed: Sep. 30, 2016

(65) Prior Publication Data
US 2017/0092900 A1    Mar. 30, 2017

(30) Foreign Application Priority Data
Sep. 30, 2015 (TW) .............................. 104131973 A (51) Int. Cl.
| H01M 2/02 | (2006.01) |
| A24F 47/00 | (2006.01) |
| H01M 10/04 | (2006.01) |
| H01M 10/0525 | (2010.01) |
| H01M 10/0587 | (2010.01) |

(52) U.S. Cl.
CPC ........... *H01M 2/022* (2013.01); *A24F 47/008* (2013.01); *H01M 10/0422* (2013.01); *H01M 10/0525* (2013.01); *H01M 10/0587* (2013.01); *H01M 2002/0205* (2013.01); *H01M 2220/30* (2013.01)

(58) Field of Classification Search
CPC . H01M 10/0422; H01M 2/022; H01M 2/0587
See application file for complete search history.

(56) References Cited

U.S. PATENT DOCUMENTS

| 2003/0003365 A1* | 1/2003 | Sagawa | .................... | H01M 2/16 429/246 |
| 2009/0159347 A1* | 6/2009 | Zhou | .................... | H01M 10/615 180/65.1 |
| 2010/0209749 A1* | 8/2010 | Okada | .................. | H01M 2/0242 429/94 |
| 2011/0091756 A1* | 4/2011 | Suzuki | .................. | H01M 2/022 429/94 |
| 2014/0087225 A1* | 3/2014 | Zhang | .................... | H01M 2/263 429/94 |

FOREIGN PATENT DOCUMENTS

| CN | 101771169 A | 7/2010 |
| CN | 101867049 A | 10/2010 |

* cited by examiner

*Primary Examiner* — Matthew J Merkling
(74) *Attorney, Agent, or Firm* — Rosenberg, Klein & Lee (57) ABSTRACT

The invention discloses a tubular lithium battery. The tubular lithium battery comprises at least a tubular body and a hollow channel. The body has at least one power supply unit, at least one packaging unit and at least two terminals. The power supply unit is packed via the packaging unit and is electrically connected to the terminals. The power supply unit and the packaging unit are wound as a whole. The hollow channel, which is positioned inside the body, is formed by winding the power supply unit and the packaging unit. The orientations and the positions of the terminals may be various due to locating in different positions of the power supply unit as well as winding the power supply unit and the packaging unit toward different directions, so that the electronic device exerting the tubular lithium battery disclosed in the present invention can be designed in various ways.

13 Claims, 10 Drawing Sheets

TUBULAR LITHIUM BATTERY

CROSS REFERENCE TO RELATED APPLICATIONS

This Non-provisional application claims priority under 35 U.S.C. § 119(a) on Patent Application No. 104131973 filed in Taiwan, Republic of China on Sep. 30, 2015, the entire contents of which are hereby incorporated by reference.

BACKGROUND

1. Technical Field

The present invention relates to a lithium battery. Specifically, the present invention relates to a tubular lithium battery, which is wound with its package to form a hollow column.

2. Description of Related Art

Conventionally, no matter for the so-called winding-type battery or for the so-called jelly-roll-type battery, the object for winding only includes the electrodes and separator. For some solid-state battery, the electrolyte may be wound with the electrodes and separator as a whole. As for the package of the battery, the common configurations of the package include the rigid metal can and the soft lamination foil. For instance, the daily used 18650 battery can be dismantled into a jelly-roll electrode and a rigid metal can; the common soft-packed lithium battery can be dismantled into a jelly-roll electrode and a soft Al lamination pouched foil.

Apparently, the conventional lithium battery can only make the electrodes, separators and even the electrolytes wound. Even if the soft lamination foil is exerted, it is still impossible to wind the soft package after the foil has been well-sealed. One of the reasons is that the most of the packages of the battery are shaped according to the required size for the certain application or for the commercial standard model so that it is not necessary to wind the packed battery for most of the packages are well shaped before sealing. The other reason is that to wind the well-sealed battery would damage the sealing condition of the package such as breaking the vacuum of the sealing of the package. Once the moisture and oxygen in the environment penetrate into the battery through the broken holes of the sealing edges, the electrodes, electrolyte and all the chemicals would be damaged due to the severe oxidation-reduction reactions.

Besides, the battery having certain size and shape would limit the possibilities of varying the design and size of the electronic device. For instance, in the electronic device, a space must be reserved for placing the battery and that would limit the design and size of the electronic device. Along with the trends of the development of the electronic device, the device having thinner and lighter characteristics cannot be achieved if the conventional battery having an un-changeable shape is exerted.

Based on what mentioned above, a battery, which can be wound after well packed, is disclosed to solve the current problems.

SUMMARY OF THE INVENTION

The present invention is to provide a tubular lithium battery. The tubular lithium battery may replace the conventional batteries, especially the columnar batteries and the cylindrical batteries. The tubular lithium battery has a hollow channel serving as a space to accommodate any elements, wires, devices, which may also electrically connect to the battery. Hence, the flexibility for electronic device design would be improved without the limitation of the battery placement. Besides, the operation voltage and/or the operation current may be adjusted by electrically connecting a plurality of batteries in series and/or in parallel.

Accordingly, to achieve the above object, the present invention discloses a tubular lithium battery comprising at least a tubular body and a hollow channel. The body has at least one power supply unit, at least one packaging unit and at least two terminals. The power supply unit is packed via the packaging unit and is electrically connected to the terminals. The power supply unit and the packaging unit are wound as a whole. The hollow channel, which is positioned inside the body, is formed by winding the power supply unit and the packaging unit. In order for various electronic device designs, the corresponding positions of the terminals of the body of the battery may be arranged by the different designs of the terminal layout of the body of the battery and/or by the different winding directions of the power supply unit and the packaging unit.

For instance, at least one terminal of the at least two terminal can be positioned on the inner side of the body after winding both the power supply unit and the packaging unit as a whole if the at least one terminal located in the starting point of the winding path. Otherwise, at least one terminal of the at least two terminal can be positioned on the outer side of the body after winding both the power supply unit and the packaging unit as a whole if the at least one terminal located in the ending point of the winding path. If at least one terminal of the at least two terminal located in the middle of the winding path, the at least one terminal can be positioned between the inner and outer sides of the body after winding both the power supply unit and the packaging unit as a whole.

According to the body of the tubular lithium battery of the present invention, the terminals may be positioned on the same side, on the corresponding sides, on the adjacent sides and the combination thereof. Besides, all the terminals may be positioned symmetrically, asymmetrically and the combination thereof.

The body may include a plurality of power supply units. The operation voltage of the battery may be increased by electrically connecting the power supply units in series. The capacity of the battery may be increased by electrically connecting the power supply units in parallel. However, no matter how to electrically connect the power supply units together, the power supply units and the related packaging units may be wound as a whole to form the body disclosed in the present invention.

As above, the present invention provides a tubular lithium battery having a body, which is formed by wound the power supply unit and the packaging unit as a whole. The corresponding positions of the terminals of the body of the battery may be arranged by the different designs of the terminal layout of the body of the battery and/or by the different winding directions of the power supply unit and the packaging unit. Besides, the operation voltage of the battery may be adjusted by electrically connecting the power supply units in series and/or in parallel. Also, the capacity of the battery may be increased by electrically connecting the power supply units in series and/or in parallel.

DETAILED DESCRIPTION

Figure 1A:
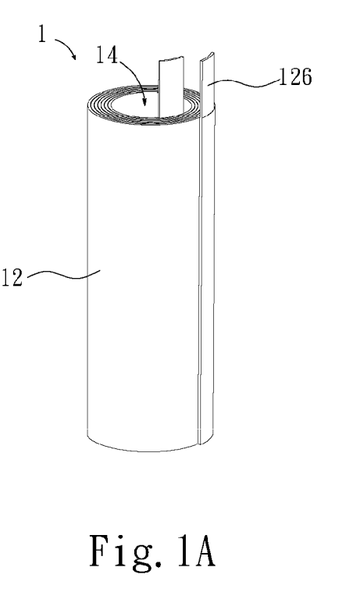
FIGS. 1A and 1B are schematic structural views of a tubular lithium battery of the present invention.
Figure 1B:
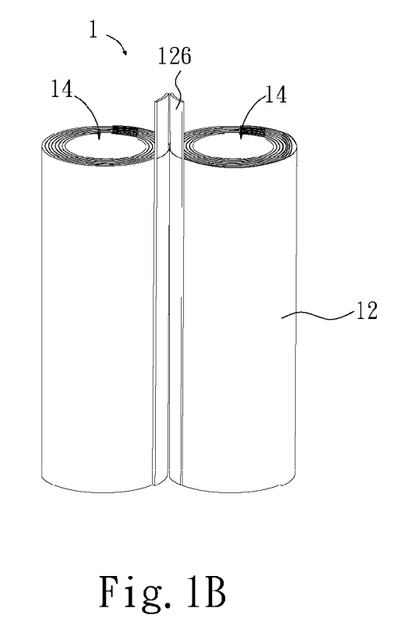

Please refer to FIG. 1A, it is a schematic structural view of a tubular lithium battery of the present invention. The tubular lithium battery 1 includes a body 12 and at least one hollow channel 14. The hollow channel 14 is positioned inside the body 12. The body 12 has at least one power supply unit 122, at least one packaging unit 124 and at least two terminals 126. The power supply unit 122 is packed by the packaging unit 124 and is electrically connected to the terminals 126. The packaging unit 124 may entirely isolate the chemicals of the power supply unit 122 from the outer environment. One of the terminals 126 is a positive terminal and the other terminal 126 is a negative terminal. The body 12 is formed by winding the power supply unit 122 and the packaging unit 124 at the same time, that is, the body 12 of the tubular lithium battery 1 is the wound power supply unit 122 and the wound packaging unit 124 as a whole and is configured as a hollow column. In this embodiment, the tubular lithium battery 1 is illustrated as a cylindrical battery with a hollow channel 14. However, the configuration of the tubular lithium battery 1 is not limited. The present invention comprises all the tubular lithium battery 1 that has the hollow channel 14 inside of its body 12 by winding the power supply unit 122 and the packaging unit 124 as a whole despite the shape of the tubular lithium battery 1. As illustrated, the hollow channel 14 formed by winding the power supply unit 122 and the packaging unit 124 is positioned inside of the body 12. More precisely, the possible positions of the hollow channel 14 corresponding to the body may be in the central axis of winding (as illustrated in FIG. 1A) or eccentric axis of winding (not illustrated). Depending on the requirements of different applications, the tubular lithium battery 1 may have more than one hollow channel 14 and the positions of these hollow channels 14 may be designed correspondingly. As illustrated in FIG. 1B, the embodiment shows a tubular lithium battery 1 has two hollow channels 14. As for the embodiment showing that a plurality of power supply units 122 are disclosed, each of the power supply units 122 may be packed by a single packaging unit 124 or may be packed by a plurality of packaging units 124 corresponding to the power supply units 122 individually. No matter what kind of packing structure, as long as the power supply units 122 are packed and sealed by the packaging unit(s) 124, the power supply units 122 and packaging units 124 may be wound as a whole to form the body 12 by the high flexibility of the units 122 and 124 without damaging and breaking the packaging units 124.

Figure 2:
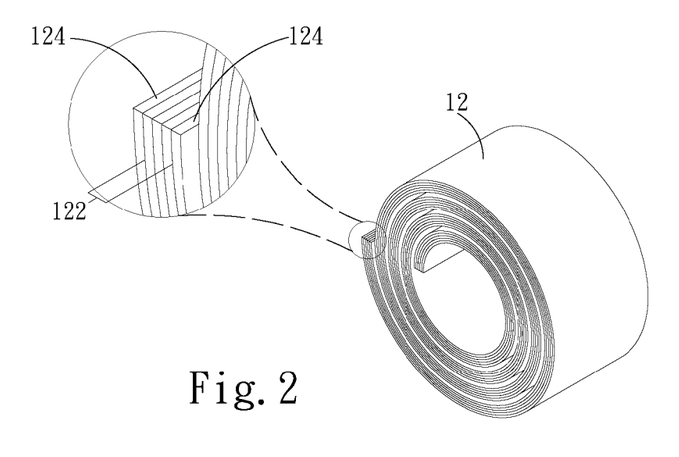
FIG. 2 is a cross-sectional view and an enlarged view of the present invention.

Please refer to FIG. 2, which illustrates a cross-sectional view and an enlarged view of the present invention according to the cross-section line A-A in FIG. 1A. The power supply unit 122 comprises the electrodes, electrolyte and all the other essential chemical materials and components for the lithium battery. The packaging unit 124 is the essential packaging materials and components for the lithium battery. Take the material as an instance, the materials of the packaging unit 124 include PI, PET, PEN, PS, PP, PVC, PBT, HDPE, LDPE, PA, acrylic resin, nylon, epoxy resin, glass fiber and/or the common commercial Al laminated foil (nylon/Al/polymer) so that the moisture and the oxygen in the eternal environment may be avoided. The power supply unit 122 includes two electrodes and at least a separator. The current collectors of the two electrodes may include the material of Cu, Al, Ni, Sn, Ag, Au, the combination thereof in an alloy-state. The separator is exerted to isolate the two electrodes to prevent the inner shorting of the power supply unit 122. The electrolyte may be well distributed in both electrodes and may include the liquid-phase electrolyte, solid-phase electrolyte, gel-type electrolyte, ionic liquid and the combination thereof. The material for the separator may include the polymer, hydro-carbon compounds, ceramic materials and/or glass fiber materials, which are electrical isolated but ionic conductive intrinsically. As packing the power supply unit 122 by the packaging unit 124, an adhesive may be exerted to seal the peripheral edges to enhance the abilities of blocking the moisture and the oxygen. The adhesive mentioned may include the materials of the epoxy resin, acrylic resin, silicone, thermal plastic polymer, PE, PP, OPP and so on. Based on the deformation ability of the adhesive, the adhesion ability may not be reduced after winding the power supply unit 122 and the packaging unit 124 as a whole.

The terminals 126 of the tubular lithium battery 1 may serve as a positive end and a negative end respectively. However, more than two terminals 126 may be designed according to the different circuit layout so that the tubular lithium battery 1 can be easier to connect to electronic devices.

Figure 3A:
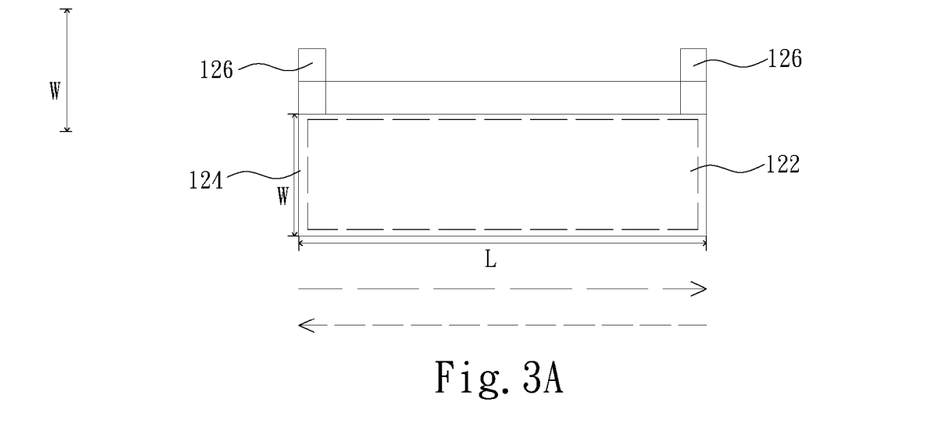
FIG. 3A to FIG. 3I are schematic views illustrating the positions of the terminals of the present invention.
Figure 3B:
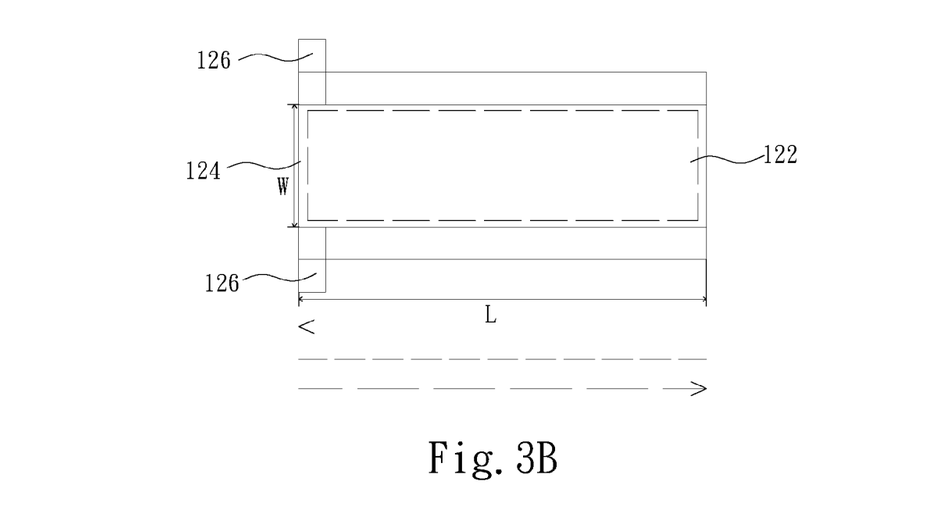
Figure 3C:
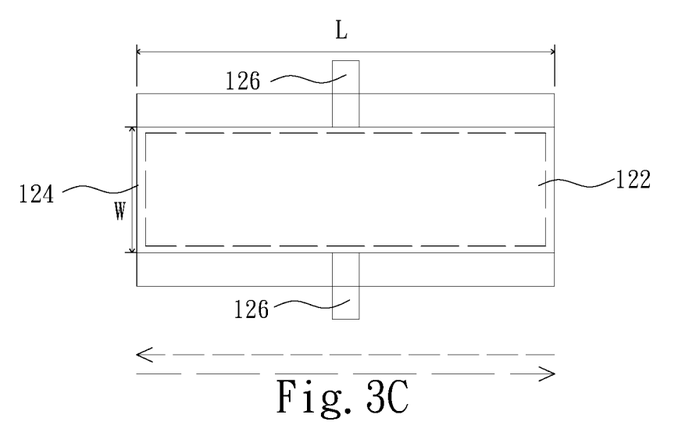
Figure 3D:
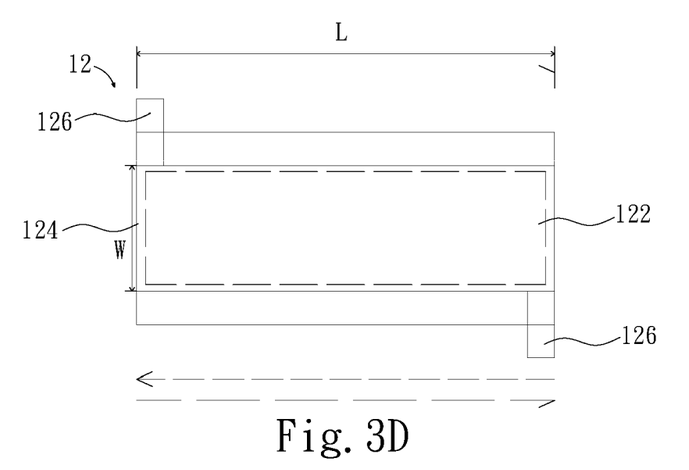
Figure 3E:
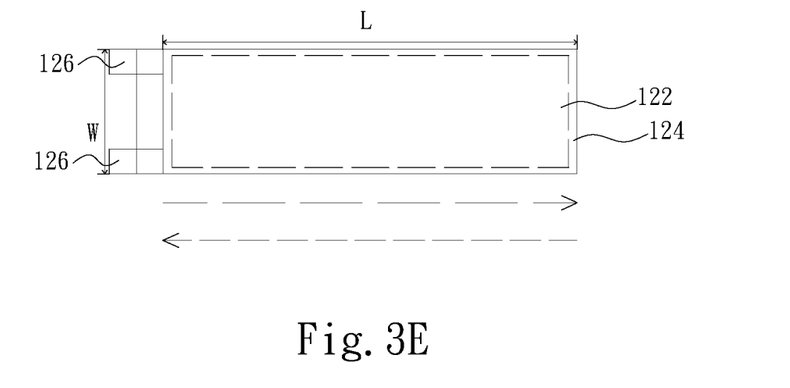
Figure 3F:
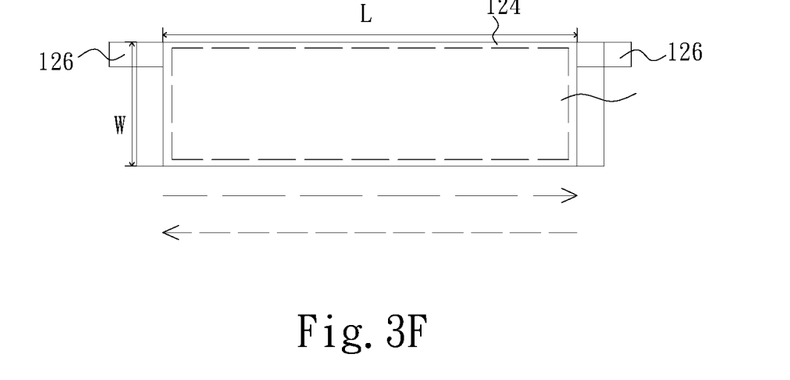
Figure 3G:
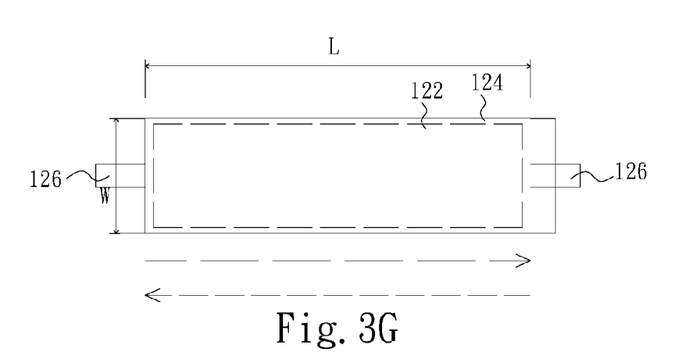
Figure 3H:
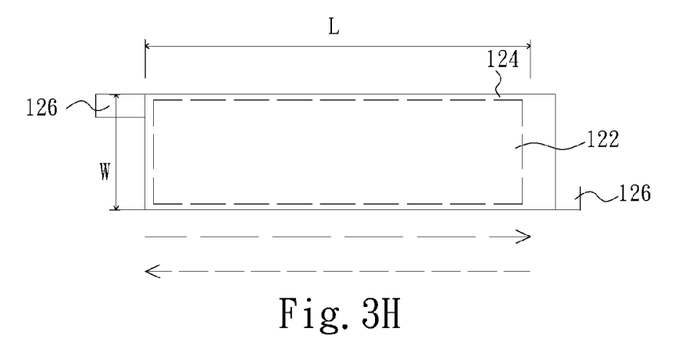
Figure 3I:
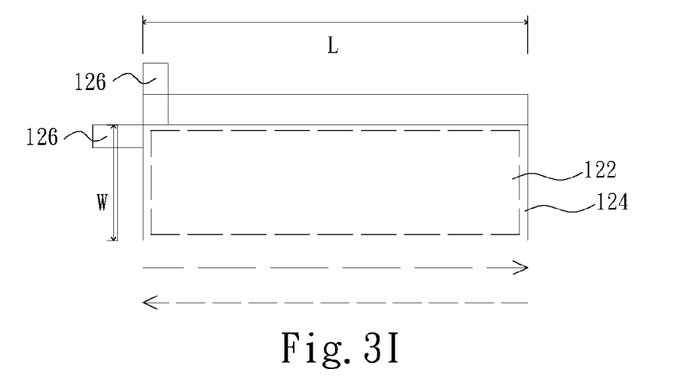

Please refer to FIGS. 3A to 3I. FIGS. 3A to 3I are schematic views illustrating the positions of two terminals of the present invention. The embodiments illustrated in FIGS. 3A to 3D show that two terminals 126 are located on the length-side L of the power supply unit 122, wherein the terminals 126 shown in FIG. 3A are located on the same side corresponding to the power supply unit 122, the terminals 126 shown in FIGS. 3B to 3C are located on the different sides corresponding to the power supply unit 122 and the terminals 126 shown in FIG. 3D are located on the different sides asymmetrically. The embodiments illustrated in FIGS. 3E to 3H show that two terminals 126 are located on the width-side W of the power supply unit 122, wherein the terminals 126 shown in FIG. 3E are located on the same side corresponding to the power supply unit 122, the terminals 126 shown in FIGS. 3F to 3G are located on the different sides corresponding to the power supply unit 122 and the terminals 126 shown in FIG. 3H are located on the different sides asymmetrically. The embodiment illustrated in FIG. 3I shows one terminal 126 is located on the length-side L of the power supply unit 122 and one terminal 126 is located on the width-side W of the power supply unit 122. The corresponding positions of terminals 126 of the above-mentioned embodiments as the power supply unit 122 and the packaging unit 124 are wound would be disclosed.

Please refer to FIG. 3A, from the top-view based on the body 12, as the power supply unit 122 and the packaging unit 124 are wound along the long-dashed line or the short-dashed line, the terminal 126 locating in the starting point of winding path would be positioned on the inner side of the body 12 and the terminal 126 locating in the ending point of winding path would be positioned on the outer side of the body 12. Because the terminals 126 are located on the same length-side L, the terminals 126 would be still positioned on the same side corresponding to the body 12 after winding. Accordingly, in FIG. 3B, as the power supply unit 122 and the packaging unit 124 are wound along the long-dashed line, two terminals 126 would be positioned in the inner side of the body 12. As the power supply unit 122 and the packaging unit 124 are wound along the short-dashed line, two terminals 126 would be positioned in the outer side of the body 12. Because the terminals 126 are located on the opposite length-side L, the terminals 126 would be still positioned symmetrically on the opposite sides corresponding to the body 12 after winding. In FIG. 3C, as the power supply unit 122 and the packaging unit 124 are wound along the long-dashed line or the short-dashed line, two terminals 126 would be positioned between the inner and outer sides of the body 12. Because the terminals 126 are located on the opposite length-side L, the terminals 126 would be still positioned symmetrically on the opposite sides corresponding to the body 12 after winding. In FIG. 3D, as the power supply unit 122 and the packaging unit 124 are wound along the long-dashed line or the short-dashed line, the terminal 126 would be positioned on the inner side of the body 12 and the terminal 126 would be positioned on outer side of the body 12. Because the terminals 126 are located on the opposite length-side L, the terminals 126 would be still positioned symmetrically on the opposite sides corresponding to the body 12 after winding.

Similarly, in FIG. 3E, as the power supply unit 122 and the packaging unit 124 are wound along the long-dashed line, two terminals 126 would be positioned in the inner side of the body 12. As the power supply unit 122 and the packaging unit 124 are wound along the short-dashed line, two terminals 126 would be positioned in the outer side of the body 12. Because the terminals 126 are located on the width-side W, the terminals 126 would not extrude from the top/bottom surface of the body 12. In FIG. 3F to 3H, as the power supply unit 122 and the packaging unit 124 are wound along the long-dashed line or the short-dashed line, one terminal 126 of the terminals 126 would be positioned on the inner side of the body 12 and the terminal 126 would be positioned on the outer side of the body 12. Because the terminals 126 are located on the opposite width-sides W, the terminals 126 would not extrude from the top/bottom surface of the body 12.

In FIG. 3I, as the power supply unit 122 and the packaging unit 124 are wound along the long-dashed line, two terminals 126 would be positioned in the inner side of the body 12. As the power supply unit 122 and the packaging unit 124 are wound along the short-dashed line, two terminals 126 would be positioned in the outer side of the body 12. The terminal 126 located on the length-side L would extrude from the top or bottom surface of the body 12 but the terminal 126 located on the width-side W would not.

Figure 4:
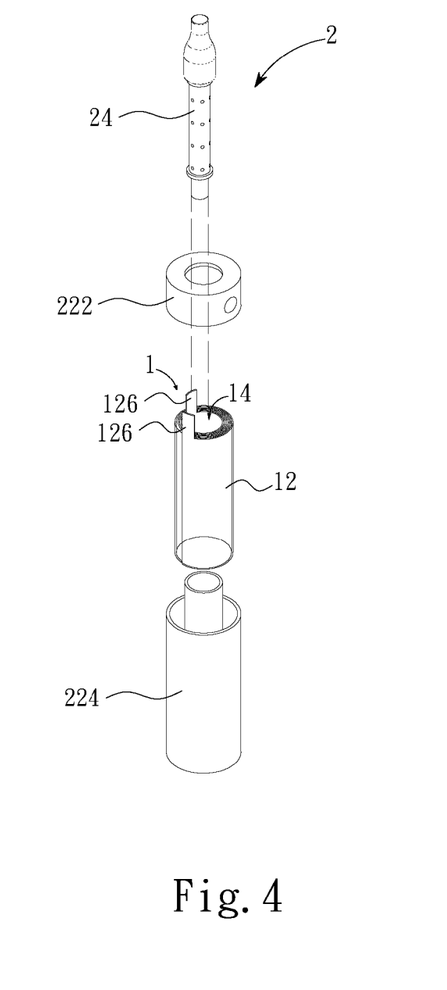
FIG. 4 is a schematic structural view of a tubular lithium battery of the present invention applied to an electronic cigarette.

Based on the embodiments mentioned above, it is known that the terminals 126 located on the length-side L or the width-side W of the body 12 would have different corresponding positions after the power supply unit 122 and the packaging unit 124 are wound. The different winding directions would affect the corresponding positions between the terminals 126 and the hollow channel 14, that is, the positions of the terminals 126 would be more closer to the inner side of the body 12 or to the outer side of the body 12 are determined by the different winding directions. The initial positions of the terminals 126 and the winding directions would affect the final positions of the terminals 126 corresponding to the body 12 after winding, wherein the final positions of the terminals 126 are usually determined by the electronic device connected to the tubular lithium battery 1. For instance, the electrical connectors of the electronic device may be located on the same side of the tubular lithium battery 1, as the electronic cigarette 2 illustrated in FIG. 4. The positive and negative connectors (not shown) of the electronic cigarette 2 are located inside the battery cover 222 or inside the battery case 224. In order to electrically connect to the connectors of the electronic cigarette 2, the terminals 126 of the tubular lithium battery 1 would prefer to be the same as the embodiment illustrated in FIG. 3A for the terminals 126 in FIG. 3A are located on the same side of the body 12 so that the terminals 126 could connect to the connectors of the electronic cigarette 2 directly. Besides, the atomizer 24 of the electronic cigarette 2 might be arranged inside of the hollow channel 14 of the tubular lithium battery 1. This arrangement is not only for space saving, but also for protecting the atomizer 24 from breaking and damaging. Meanwhile, the space saved might shorten the total length of the electronic cigarette 2 for improving its convenience and portability. In other applications, such as those electronic devices which are inserted into the hollow channel 14 and/or those electronic devices having the connectors which might insert into the hollow channel 14, the terminals 126 would prefer to be like the embodiment illustrated in FIG. 3E.

Under some situations, the terminals could be folded or bended. However, if the terminals are folded or bended, the length or the area of the terminals might be long or large enough for connecting to the electronic device. The connecting methods of the tubular lithium battery and the electronic device include adhering, welding, ultra-sonic welding and so on. In some cases, the terminals might be the metal tabs having at least one conductive surface. Practically, the terminals of the tubular lithium battery might be designed according to the electronic device connected so that even if the tubular lithium battery has various configurations, it is still has no difficulties to electrically connect to any electronic devices. Furthermore, the tubular lithium battery has at least one hollow channel so that the designs and the configurations of the electronic device become much more flexible.

The terminals of the tubular lithium battery might be a part of the flexible printed circuit. The circuit layout could be directly integrated with the terminals. For instance, the protective circuit module and any other electronic devices could be integrated with the terminals to avoid the complex circuit layout.

Figure 5:
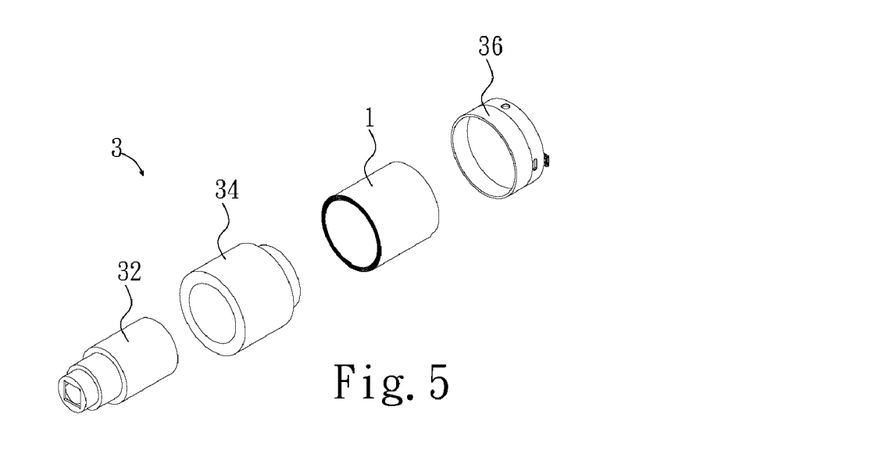
FIG. 5 is a schematic view illustrating the structure of a tubular lithium battery of the present invention applied to an external camera.

Please refer to FIG. 5. An external camera having the tubular lithium battery is illustrated. The tubular lithium battery 1 is surrounded the outside of the external camera 3. The terminals of the tubular lithium battery 1 would be designed according to the connectors of the external camera 3 as mentioned above. The conventional bulky battery are replaced by the tubular lithium battery 1 positioned behind the lens 32 so that the battery compartment 34 is not necessary. Accordingly, the thickness of the external camera 3 can be reduced and the size of the battery would not be limited by the rear cover 36. If the thickness of the external camera 3 remains, the lens 32 may has more space for zooming.

In order to increase the operation voltage or the capacity of the battery, the tubular lithium battery 1 might be electrically connected in series or in parallel. The related embodiments are illustrated in FIGS. 6A to 6C.

Figure 6A:
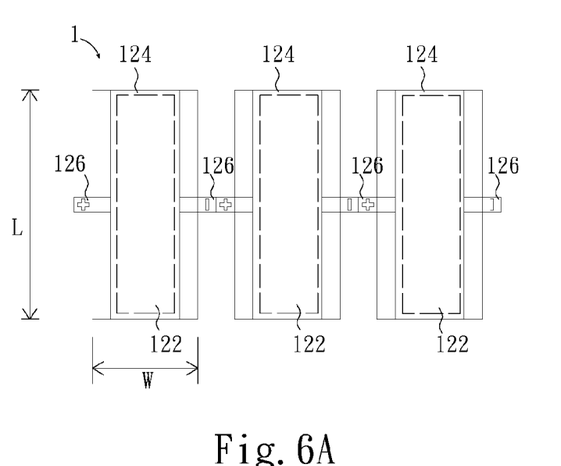
FIG. 6A to FIG. 6C are schematic views illustrating a battery array in series and in parallel of the present invention.

In FIG. 6A, a tubular lithium battery having three power supply units 122, which are electrically connected in series, is shown. Each of the power supply units 122 is connected by its two terminals 126 respectively in series. The terminals 126 are located on the opposite length-side L of the power supply unit 122. All the power supply units 122 might be electrically connected by clapping, riveting, welding, electrical conductive adhering and so on. All the power supply units 122, which are electrically connected in series, and the corresponding packaging units 124 are wound as a whole to form the body of the tubular lithium battery. The tubular lithium battery has multiple power supply units 122 in series so that the operation voltage of the tubular lithium battery might be increased.

Figure 6B:
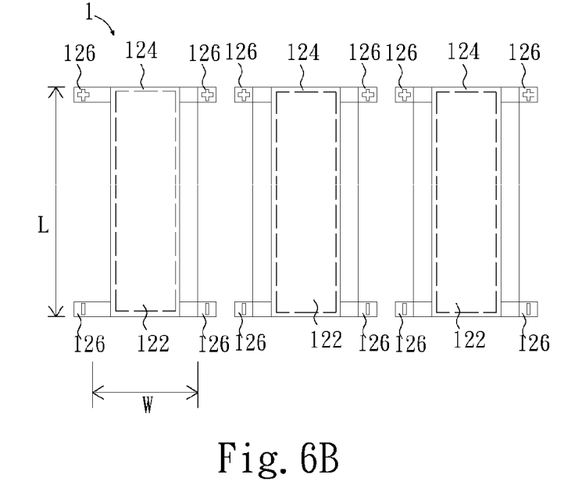

In FIG. 6B, the power supply units 122 are electrically connected in parallel by connecting the terminals 126 in the order of positive terminal to positive terminal and the negative terminal to negative terminal. All the power supply units 122, which are electrically connected in parallel, and the corresponding packaging units 124 are wound as a whole to form the body of the tubular lithium battery. The tubular lithium battery has multiple power supply units 122 in parallel so that the capacity of the tubular lithium battery might be increased.

Figure 6C:
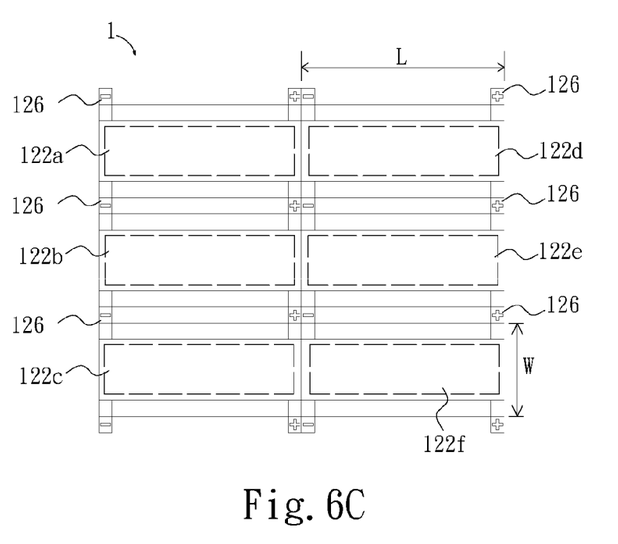

Please refer to FIG. 6C, a tubular lithium battery having six power supply units is illustrated. Three of the power supply units 122a, 122b and 122c are electrically connected in parallel and three of the power supply units 122d, 122e and 122f are electrically connected in parallel too. Then, the power supply units (122a, 122b and 122c) are electrically connected in series to the power supply units (122d, 122e and 1220 individually. For instance, the power supply unit 122a is electrically connected to the power supply unit 122d in series, the power supply unit 122b is electrically connected to the power supply unit 122e in series and the power supply unit 122c is electrically connected to the power supply unit 122f in series as illustrated in FIG. 6C. In this embodiment, the tubular lithium battery may have an increased operation voltage and an increased capacity at the same time.

Although the operation voltage and the capacity of the tubular lithium battery might be increased by exerting more power supply units, the deformation stress of the body of the tubular lithium battery would increase due to the increasing numbers of winding and the increasing volume. In order to remain the shape of the tubular lithium battery, a cover (not shown) might be exerted to fasten the body of the tubular lithium battery for a certain size or shape. Furthermore, a fixing element might be exerted to fix the wound body, wherein the fixing element might be the tape, buckle and so on.

According to the tubular lithium battery of the present invention, the orientations and the positions of the terminals may be various due to locating in different positions of the power supply unit as well as winding the power supply unit and the packaging unit toward different directions, so that the electronic device exerting the tubular lithium battery disclosed in the present invention can be designed in various ways.

What is claimed is:

1. A tubular lithium battery, comprising:
   a body having at least one power supply unit, at least one moisture and oxygen blocking and packaging unit to block moisture and oxygen in an external environment, and at least two terminals, and the power supply unit is packed via the packaging unit and is electrically connected to the terminals, and the power supply unit is wound with the packaging unit; and
   at least a hollow channel formed via winding the power supply unit and the packaging unit and positioned inside the body;
   wherein the power supply unit includes two electrodes and at least one separator, the packaging unit comprising at least two layers packing the power supply unit for avoiding moisture and oxygen from external environment.

2. The tubular lithium battery as claimed in claim 1, wherein a plurality of the power supply units are electrically connected in series and/or in parallel.

3. The tubular lithium battery as claimed in claim 1, wherein the terminals are positioned on a same side of the power supply unit, on a corresponding side of the power supply unit, on an adjacent side of the power supply unit or combination thereof.

4. The tubular lithium battery as claimed in claim 1, wherein the terminals are positioned symmetrically, asymmetrically or combination thereof.

5. The tubular lithium battery as claimed in claim 1, wherein after winding the power supply unit and the packaging unit, at least one terminal of the at least two terminals is positioned on an inner side of the body as the at least one terminal locating in a starting point of winding path.

6. The tubular lithium battery as claimed in claim 1, wherein after winding the power supply unit and the packaging unit, at least one terminal of the at least two terminals is positioned on an outer side of the body as the at least one terminal locating in an ending point of winding path.

7. The tubular lithium battery as claimed in claim 1, wherein after winding the power supply unit and the packaging unit, at least one terminal of the at least two terminals is positioned between the inner and outer sides of the body as the at least one terminal locating between the starting and ending points of the winding path.

8. The tubular lithium battery as claimed in claim 1, wherein the terminals have at least one conductive surface.

9. The tubular lithium battery as claimed in claim 1, wherein the terminals are connected to an electronic device.

10. The tubular lithium battery as claimed in claim 9, wherein the electronic device is an electronic cigarette.

11. The tubular lithium battery as claimed in claim 1, further comprising a fixing member provided on an outer surface of the packaging unit.

12. The tubular lithium battery as claimed in claim 1, further comprising a fixing element positioned on an outer surface of the packaging unit.

13. The tubular lithium battery as claimed in claim 1, further comprising a cover to fasten the body.

\* \* \* \* \*